(12) United States Patent
Kitanaka (10) Patent No.: US 7,977,819 B2
(45) Date of Patent: Jul. 12, 2011

(54) POWER CONVERTER AND CONTROLLER USING SUCH POWER CONVERTER FOR ELECTRIC ROLLING STOCK

(75) Inventor: Hidetoshi Kitanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 12/375,864

(22) PCT Filed: Aug. 9, 2006

(86) PCT No.: PCT/JP2006/315760
§ 371 (c)(1), (2), (4) Date: Jan. 30, 2009

(87) PCT Pub. No.: WO2008/018131
PCT Pub. Date: Feb. 14, 2008

(65) Prior Publication Data
US 2009/0322148 A1 Dec. 31, 2009

(51) Int. Cl.
*H02J 9/00* (2006.01)

(52) U.S. Cl. ............... 307/64; 363/15; 363/16; 363/34; 363/123; 363/140

(58) Field of Classification Search .............. 361/15, 361/16, 34, 123, 140
See application file for complete search history.

(56) References Cited

U.S. PATENT DOCUMENTS

| | | | |
|---|---|---|---|
| 5,399,909 A * | 3/1995 | Young | 307/65 |
| 6,122,181 A * | 9/2000 | Oughton, Jr. | 363/37 |
| 6,154,375 A * | 11/2000 | Majid et al. | 363/16 |
| 2003/0137197 A1 * | 7/2003 | Raddi et al. | 307/66 |
| 2008/0272706 A1 * | 11/2008 | Kwon et al. | 315/219 |
| 2009/0267412 A1 * | 10/2009 | Kitanaka | 307/10.7 |

FOREIGN PATENT DOCUMENTS

| | | |
|---|---|---|
| JP | 57-179718 U | 11/1982 |
| JP | 2001-178117 A | 6/2001 |
| JP | 2003-088143 | 3/2003 |
| JP | 2004-108226 | 4/2004 |
| JP | 2005-278269 | 10/2005 |
| JP | 2006-014395 A | 1/2006 |

OTHER PUBLICATIONS

WO 2005/013455 to Akamatsu et al., Feb. 10, 2005.*
International Search Report for PCT/JP2006/315760 completed Oct. 24 2006.
Notification of the Reasons for Refusal in JP 2006-545350 dated Apr. 28, 2009, and an English Translation thereof.

* cited by examiner

*Primary Examiner* — Jared J Fureman
*Assistant Examiner* — Justen Fauth
(74) *Attorney, Agent, or Firm* — Buchanan Ingersoll & Rooney PC (57) ABSTRACT

Provided is a power converter having an inverter (13) wherein capacitors (12) are connected in parallel on a direct current side, and a power supply circuit configured to supply the inverter with a direct current from a power supply (1) and a power storage element (14). A controller using such power converter is also provided for electric rolling stocks. The power supply circuit is provided with a power supply switch (S1) arranged between the power supply and the inverter, a DC-to-DC converter (15A) arranged between the power storage element and the inverter, and a bypass switch (S2) arranged between the power storage element and the inverter.

6 Claims, 10 Drawing Sheets

POWER CONVERTER AND CONTROLLER USING SUCH POWER CONVERTER FOR ELECTRIC ROLLING STOCK

TECHNICAL FIELD

The present invention relates to a power converter that utilizes electric power received from a power source and electric power from a power storage unit capable of storing DC electric power so as to supply a load with electric power through an inverter, and to an electric rolling stock controller utilizing the power converter.

BACKGROUND ART

In recent years, a method has been being developed in which a power storage element formed of a secondary battery, an electric double layer capacitor, or the like is applied to an electric rolling stock controller; it is known that the electric rolling stock controller is configured in such a way that superfluous regenerative electric power generated while a vehicle is braked during a regenerative period is stored and the stored electric power is utilized while the vehicle is accelerated during a power running period, so that the kinetic energy of the vehicle can effectively be utilized (e.g., refer to Patent Document 1). Patent Document 1 discloses that an electric rolling stock travels by means of electric power from a power storage element, without receiving electric power from an overhead line.

Patent Document 1: Japanese Patent Laid-Open Pub. No. 2006-14395

DISCLOSURE OF THE INVENTION

Problems to be Solved by the Invention

Recently, development of secondary batteries and electric double-layer capacitors has been being carried out actively, and the amount of storable energy has been enlarged; however, the present technology requires a considerably large and heavy power storage element in order to obtain an energy amount large enough to make an electric rolling stock travel. In this regard however, because the mounting space in an electric rolling stock is limited, it is important to suppress as much as possible the size and the mass of a power storage element. Accordingly, it is important to effectively utilize the stored energy of a power storage element; thus, it is indispensable to improve the energy efficiency of an electric rolling stock controller so as to reduce a loss in the controller as much as possible.

The present invention has been implemented in consideration of the foregoing points; with regard to a power converter having a power storage unit and an electric rolling stock controller utilizing the power converter, the objective of the present invention is to provide a power converter in which, when an inverter is driven with electric power only from the power storage unit so as to supply a load with AC power, the loss in stored energy of the power storage unit is reduced and the stored energy of the power storage unit is effectively utilized so that the energy efficiency is enhanced; it is also the objective of the present invention to provide an electric rolling stock controller utilizing that power converter.

Means for Solving the Problems

A power converter according to the present invention is provided with an inverter that supplies a load with electric power; a capacitor connected between DC terminals of the inverter; a power supply switch provided between one terminal of the capacitor and a power source; a power storage unit that stores DC power; a DC-to-DC converter having a reactor and at least one pair of switching elements connected in series for charging the power storage unit with electric power and discharging electric power from the power storage unit, the DC-to-DC converter being connected in parallel with the capacitor; and a bypass switch that connects the power storage unit in parallel with the capacitor, without the intermediary of the switching elements.

Moreover, a power converter according to the present invention is provided with an inverter that supplies a load with electric power; a capacitor connected between DC terminals of the inverter; a power supply switch provided between one terminal of the capacitor and a power source; a power storage unit that stores DC power; and a DC-to-DC converter having a reactor and at least one pair of switching elements connected in series for charging the power storage unit with electric power and discharging electric power from the power storage unit, the DC-to-DC converter being connected in parallel with the capacitor, and the power converter is configured in such a way that on and off states of the switching elements are fixed in such a way that, in the case where the power supply switch is off, the power storage unit is connected in parallel with the capacitor.

An electric rolling stock controller according to the present invention is provided with an inverter that drives a motor; a capacitor connected between DC terminals of the inverter; a power supply switch provided between one terminal of the capacitor and an overhead line; a power storage unit that stores DC power; a DC-to-DC converter having a reactor and at least one pair of switching elements connected in series for charging the power storage unit with electric power and discharging electric power from the power storage unit, the DC-to-DC converter being connected in parallel with the capacitor; and a bypass switch that connects the power storage unit in parallel with the capacitor, without the intermediary of the switching elements.

Moreover, an electric rolling stock controller according to the present invention is provided with an inverter that drives a motor; a capacitor connected between DC terminals of the inverter; a power supply switch provided between one terminal of the capacitor and an overhead line; a power storage unit that stores DC power; and a DC-to-DC converter having a reactor and at least one pair of switching elements connected in series for charging the power storage unit with electric power and discharging electric power from the power storage unit, the DC-to-DC converter being connected in parallel with the capacitor, and the electric rolling stock controller is configured in such a way that on and off states of the switching elements are fixed in such a way that, in the case where the power supply switch is off, the power storage unit is connected in parallel with the capacitor.

ADVANTAGES OF THE INVENTION

According to a power converter of the present invention and an electric rolling stock controller utilizing the power converter, there can be obtained a power converter in which, in the case where an inverter is driven only with electric power from a power storage unit so as to supply a load with electric power, the energy loss in a DC-to-DC converter is reduced, whereby the energy stored in the power storage unit can effectively be utilized and an electric rolling stock controller utilizing the power converter.

Moreover, in a power converter of the present invention and an electric rolling stock controller utilizing the power converter, in the case where an inverter is driven only with electric power from a power storage unit so as to supply a load with electric power, the power storage unit can be connected with the inverter via switching elements and a reactor, without adding a bypass switch; therefore, the loss in a DC-to-DC converter is reduced, whereby the energy stored in the power storage unit can effectively be utilized, and because the reactor can prevent a ripple current from flowing into the power storage unit, it is made possible to reduce the loss in the power storage unit and to prolong the life thereof.

DESCRIPTION OF REFERENCE NUMERALS

1. OVERHEAD LINE
2. POWER COLLECTOR
3. ELECTRIC ROLLING STOCK CONTROLLER
4. WHEEL
5. RAIL
6. MOTOR
11. REACTOR
12. CAPACITOR
13. INVERTER
14. POWER STORAGE UNIT
15A&15B. DC-TO-DC CONVERTER
16.-19. SWITCHING ELEMENT
20. REACTOR
21. CAPACITOR
22. REACTOR
S1. POWER SUPPLY SWITCH
S2. BYPASS SWITCH

BEST MODE FOR CARRYING OUT THE INVENTION

Embodiment 1

Figure 1:
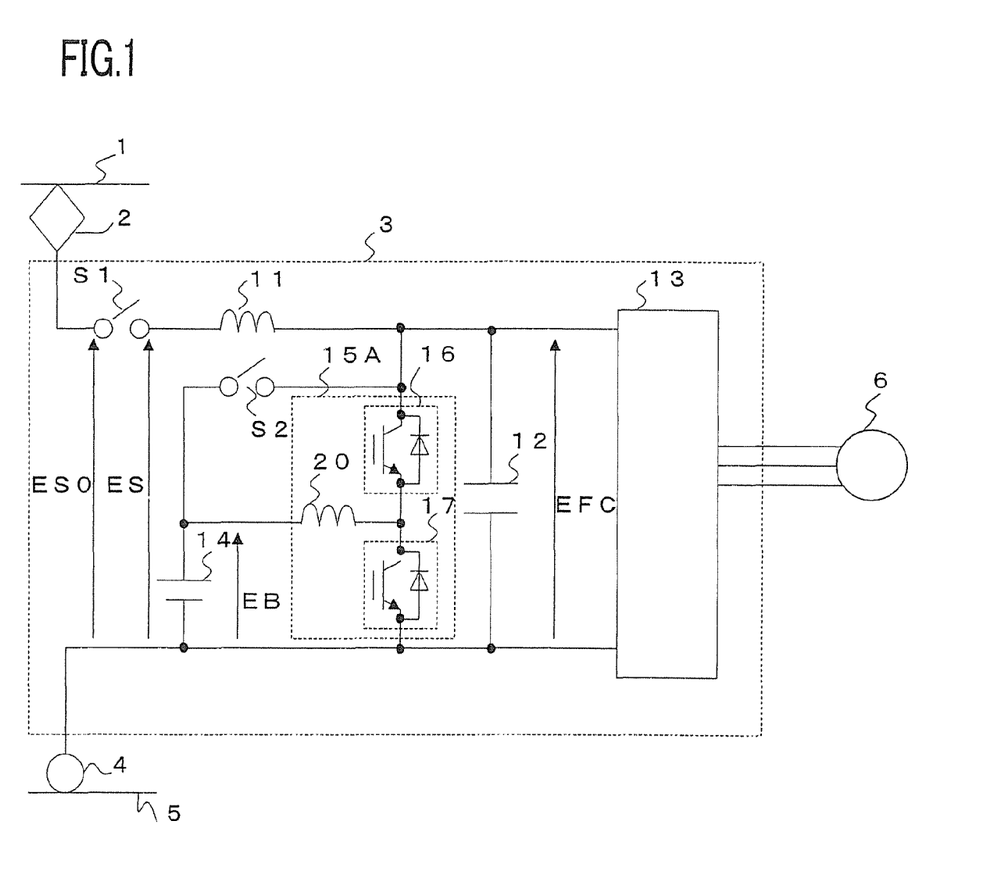
FIG. 1 is a diagram illustrating the configuration including a power converter according to Embodiment 1 of the present invention and an electric rolling stock controller utilizing the power converter.

FIG. 1 is a diagram illustrating the configuration of an electric rolling stock controller according to Embodiment 1 of the present invention. In FIG. 1, electric power received from an overhead line, which is a power source, through a power collector 2 is inputted to an electric rolling stock controller 3. The electric rolling stock controller 3 is configured in such a way as to be connected to an AC motor 6 as a load and to drive the motor 6 so as to make the electric rolling stock travel. A load current from the electric rolling stock controller 3 returns to a rail 5 through a wheel 4.

The electric rolling stock controller 3 is configured with a circuit that supplies an inverter 13, with which a capacitor 12 is connected in parallel, with electric power received from the overhead line 1, via a switch S1 as a power supply switch and a reactor 11; a circuit that supplies the inverter 13 with DC power from a power storage element 14 as a power storage unit, via a DC-to-DC converter 15A; and a switch S2 as a bypass switch for supplying the inverter 13 with electric power from the power storage element 14, without the intermediary of the DC-to-DC converter 15A. Here, the power storage element 14 is a secondary battery, an electric double-layer capacitor, or the like. It is preferable that switches having a mechanical contact are utilized as the switches s1 and S2; however, even though electronic switches, formed of a semiconductor device whose conduction loss is low, are utilized as the switched S1 and s2, the effect of the present invention is not considerably impaired. In Embodiment 1, an example in which a switch having a mechanical contact is utilized will be explained.

The DC-to-DC converter 15A is a circuit capable of performing bidirectional power control, i.e., from the power storage element 14 to the inverter 13 and from the inverter 13 to the power storage element 14, under the condition that an inverter input voltage EFC is larger than a voltage EB across the power storage element 14; the DC-to-DC converter 15A is a so-called bidirectional step-down DC-to-DC converter circuit configured with switching elements 16 and 17 and a reactor 20. Because the operation of the DC-to-DC converter circuit is publicly known, explanation therefor will be omitted. In addition, an overhead line voltage ESO, the inverter input voltage EFC, the voltage EB across the power storage element 14 can be detected by respective unillustrated voltage detectors. In this situation, the switch S2 is provided for directly performing electric-power transfer between the power storage element 14 and the inverter 13, without the intermediary of the DC-to-DC converter 15A; the switch S2 is the subject matter of the present invention.

Next, the operation of the electric rolling stock controller, configured as described above, according to Embodiment 1 will be explained. First, the operation in a mode (referred to as an overhead line/battery combination mode, hereinafter), in which an electric rolling stock travels by arbitrarily transferring electric power to and receiving electric power from the overhead line 1 or the power storage element 14, will be explained.

In this mode, in the case where the electric rolling stock is accelerated in a power running manner, electric power from the overhead line 1 is supplied to the inverter 13, and electric power from the power storage element 14 is adjusted to an optimal value by the DC-to-DC converter 15A and then supplied to the inverter 13, so that the motor 6 is driven with electric power that is the sum of the electric power from the overhead line 1 and the electric power from the power storage element 14. As a specific example, in the case where the amount of stored energy in the power storage element 14 is slightly insufficient, the DC-to-DC converter 15A suppresses the power storage element 14 from discharging electric power, so that more electric power is received from the overhead line 1.

In the case where the overhead line voltage ESO is low, or in the case where the amount of stored energy in the power storage element 14 is slightly excessive, the DC-to-DC converter 15A operates in such a way as to supply more electric power from the power storage element 14. In such a manner as described above, while optimally receiving electric power from both the overhead line 1 and the power storage element 14, the motor 6 is driven so as to make the electric rolling stock travel.

In addition, in the case where the electric rolling stock is braked during a regenerative period, the motor 6 comes into a regenerative operation, and the DC-to-DC converter 15A operates in such a way as to appropriately distribute regenerative electric power from the inverter 13 to the overhead line 1 and the power storage element 14. As a specific example, in the case where the amount of stored energy in the power storage element 14 is slightly insufficient, or in the case where, because no load of the overhead line 1 exists, electric power is not sufficiently regenerated, the DC-to-DC converter 15A operates in such a way that more electric power is regenerated for the power storage element 14. In contrast, in the case where the amount of stored energy in the power storage element 14 is slightly excessive, the DC-to-DC converter 15A operates in such a way as to suppress regenerative electric power for the power storage element 14 so that almost all regenerative electric power is produced for the overhead line 1. In such a manner as described above, regenerative electric power from the motor 6 is optimally distributed to the overhead line 1 and the power storage element 14, whereby the regenerative brake on the electric rolling stock works.

Next, the operation in a mode (referred to as a battery operation mode, hereinafter), in which the electric rolling stock travels only with electric power from the power storage element 14, will be explained. The foregoing battery operation mode is established based on, for example, a case where the electric rolling stock travels in the section where the overhead line 1 is not installed or a case where, even though the overhead line 1 is installed, the electric rolling stock travels in a section where no electric power is supplied through the overhead line 1. In the battery operation mode, the switch S1 and the DC-to-DC converter 15A (the switching elements 16 and 17 are turned off) are turned off, and the switch S2 is turned on. In the case where the electric rolling stock is accelerated in a power running manner, electric power from the power storage element 14 is supplied directly to the inverter 13 via the switch S2, without the intermediary of the DC-to-DC converter 15A, so that the motor 6 is driven.

In such a manner as described above, while receiving electric power from the power storage element 14, the motor 6 is driven; thus, it is made possible to make the electric rolling stock travel even on a track where the overhead line 1 is not installed.

In addition, in the case where the electric rolling stock is braked during a regenerative period, the motor 6 comes into a regenerative operation, and regenerative electric power from the inverter 13 is transferred directly to the power storage element 14 via the switch S2, without the intermediary of the DC-to-DC converter 15A.

As described above, regenerative electric power from the motor 6 is transferred to the power storage element 14, whereby the regenerative brake on the electric rolling stock works even on a track where the overhead line 1 is not installed.

Figure 2:
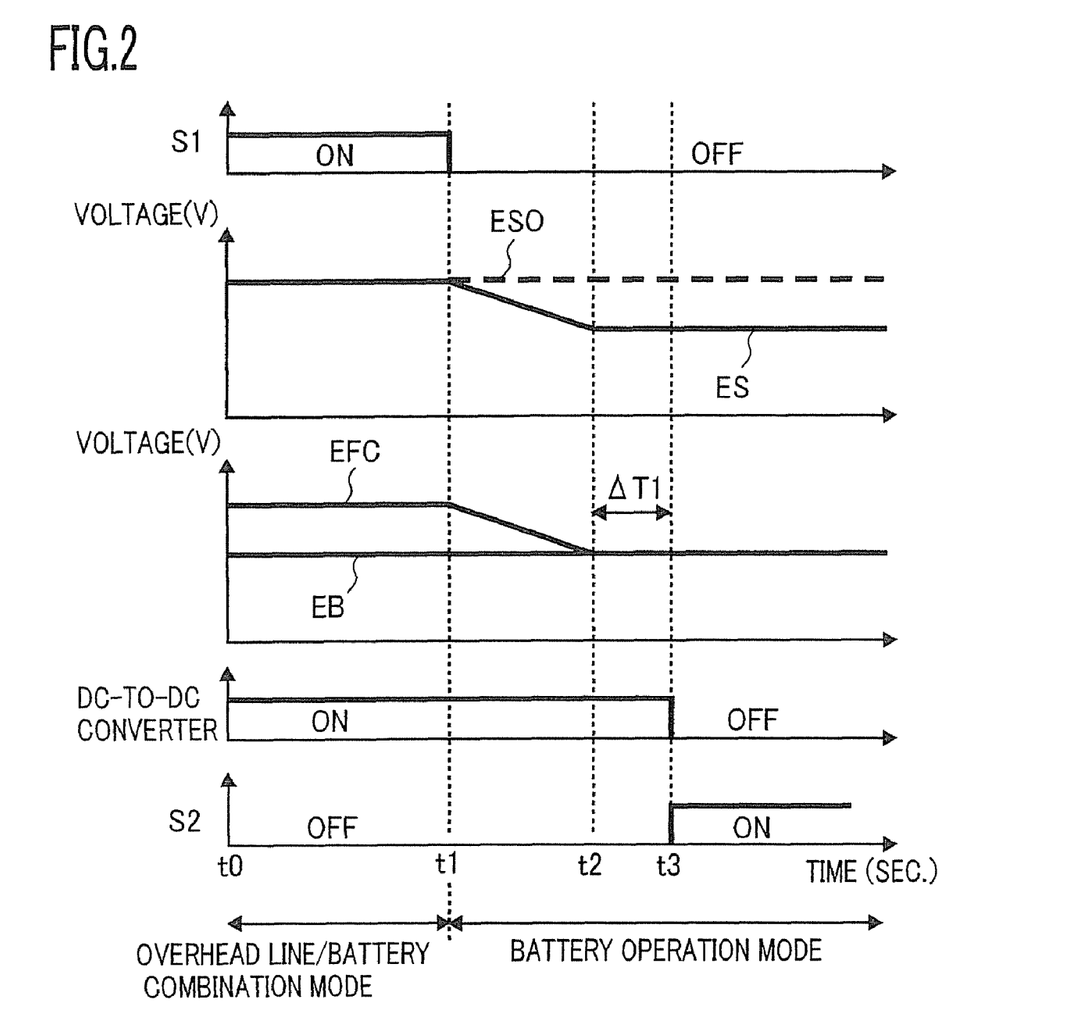
FIG. 2 is a chart for explaining the transition, according to Embodiment 1 of the present invention, from an overhead line/battery combination mode to a battery operation mode.

Next, the operation in the case in which transition is made from the overhead line/battery combination mode to the battery operation mode will be explained, and the operation in the case in which transition is made from the battery operation mode to the overhead line/battery combination mode will also be explained. FIG. 2 is a chart for explaining the transition, according to Embodiment 1, from the overhead line/battery combination mode to the battery operation mode. As represented in FIG. 2, in the overhead line/battery combination mode during the time period between a time instant t0 and a time instant t1, the switch S1 and the DC-to-DC converter 15A are turned on (the switching elements 16 and 17 are in a PWM operation); therefore, the overhead line voltage ESO is applied to the capacitor 12, and the voltage EB across the power storage element 14 is stepped up by the DC-to-DC converter 15A and then applied to the capacitor 12. Accordingly, an input voltage ES at the stage after the switch S1 is equal to the overhead line voltage ESO, and the inverter input voltage EFC is equal to the input voltage ES.

In this situation, the voltage EB across the power storage element 14 is lower than the inverter input voltage EFC; the reason for that is that the voltage EB across the power storage element 14 is set to be lower than the variation lower limit value of the inverter input voltage EFC that varies in response to the overhead line voltage ESO, in consideration of the fact that, as explained above, the DC-to-DC converter 15A is a circuit capable of controlling electric power only under the condition that the inverter input voltage EFC is higher than the voltage EB across the power storage element 14. The above explanation will be complemented below. The typical nominal value of the overhead line voltage ESO is 600 V for streetcars, 750 V for many of subway cars, and 1500 V for suburban trains; however, because considerably varying depending on the distance between the substation and the electric rolling stock and the traveling condition of an electric rolling stock, the overhead line voltage ESO received by the electric rolling stock varies within a range from −40% to +20% of the nominal value. In other words, the voltage EB across the power storage element 14 is set in such a way as to be maintained lower than the inverter input voltage EFC even in the case where the overhead line voltage ESO (equal to the inverter input voltage EFC) is −40% of the nominal value, i.e., the variation lower limit value.

Next, at the time instant t1, the overhead line/battery combination mode is ended, and then the switch S1 is turned off. In addition, it is preferable that, in order to prevent the sudden change in the current, the switch S1 is turned off after the current in the switch S1 is reduced to a considerably small value (after being reduced to a value the same as or lower than a setting value) by reducing the output of the inverter 13 to a value the same as or lower than a setting value, or by controlling the DC-to-DC converter 15A in such a way that almost or all the electric power of the inverter 13 is imposed on the power storage element 14. After that, the DC-to-DC converter 15A is controlled in such a way that the inverter input voltage EFC and the voltage EB across the power storage element 14 coincide with each other.

When, at a time instant t2, the inverter input voltage EFC coincides with the voltage EB across the power storage element 14, the DC-to-DC converter 15A is controlled in such a way that the state in which the inverter input voltage EFC coincides with the voltage EB across the power storage element 14 is maintained.

After the state in which the difference between the inverter input voltage EFC and the voltage EB across the power storage element 14 is the same as or smaller than a setting value continues for ΔT1 (at a time instant t3), it can be determined that the inverter input voltage EFC has sufficiently stabilized; therefore, the switch S2 is turned on, and the DC-to-Dc converter 15A is turned off.

When the switch S2 is turned on, the current that flows from the power storage element 14 to the inverter 13 changes its path from a route through the switching element 16 of the DC-to-DC converter 15A to a route through the switch S2 and without the intermediary of the DC-to-to converter 15A. The above explanation will be complemented below. Even in the case, when the inverter 13 is operated in a power running manner, the DC-to-DC converter 15A is turned off, there exists a current path from the power storage element 14 to the inverter 13 via a diode incorporated in the switching element 16; however, because the diode incorporated in the switching element 16 is formed of a semiconductor, the forward voltage drop (several volts) works as a kind of resistor; thus, the diode has a larger resistance than the switch S2 formed of a mechanical contact having a minute contact resistance. Accordingly, when the switch S2 is turned on, the current that flows from the power storage element 14 to the inverter 13 automatically changes its path from a large-resistance route through the switching element 16 of the DC-to-DC converter 15A to a minute-resistance route through the switch S2. In such a manner as described above, transition can smoothly be made from the overhead line/battery combination mode to the battery operation mode.

Figure 3:
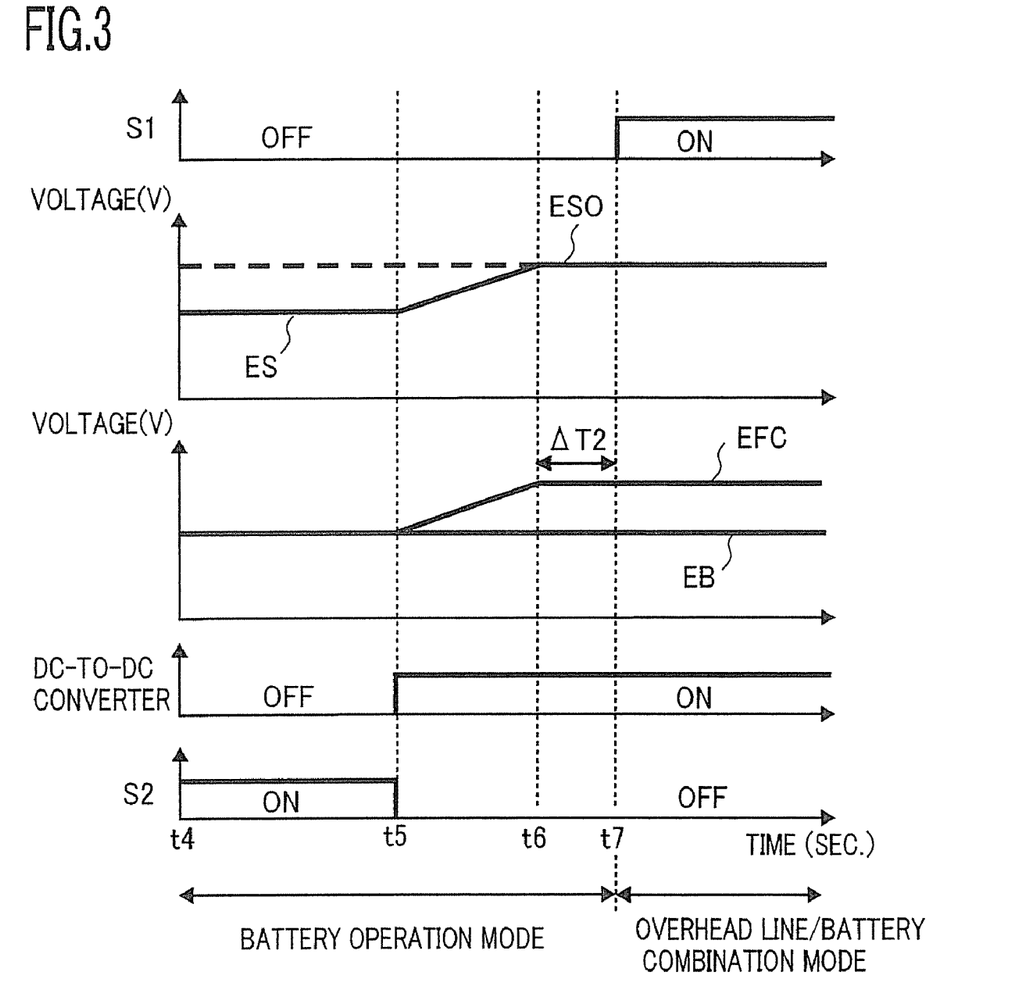
FIG. 3 is a chart for explaining the transition, according to Embodiment 1 of the present invention, from the battery operation mode to the overhead line/battery combination mode.

Next, the operation in the case in which transition is made from the battery operation mode to the overhead line/battery combination mode will be explained. FIG. 3 is a chart for explaining the transition, according to Embodiment 1, from the battery operation mode to the overhead line/battery combination mode.

As represented in FIG. 3, in the time period between a time instant t4 and a time instant t5, the switch S1 and the DC-to-DC converter 15A are turned off, and the switch S2 is turned on; in the foregoing time period, the power storage element 14 directly transfers electric power to and receives electric power from the inverter 13, via the switch S2. Accordingly, the inverter input voltage EFC is equal to the voltage EB across the power storage element 14. At the time instant t5, the switch S2 is turned off, and at the same time, the DC-to-DC converter 15A is activated so that the switching elements 16 and 17 operate in a PWM manner. In addition, it is preferable that, in order to prevent fluctuation in the current from being caused, turning off the switch S2 and activation of the DC-to-DC converter 15A are made after the current of the power storage element 14 is reduced to a value the same as or smaller than a setting value by suppressing the current of the inverter 13.

After the time instant t5, the DC-to-DC converter 15A is operated to perform a step-up function so as to step up the voltage EB across the power storage element 14, and controlled in such a way that the inverter input voltage EFC and the overhead line voltage ESO coincide with each other. At a time instant t6, the inverter input voltage EFC coincides with the overhead line voltage ESO.

After the state in which the difference between the inverter input voltage EFC (equal to the input voltage ES) and the overhead line voltage ESO is the same as or smaller than a setting value continues for ΔT2, it can be determined that the inverter input voltage EFC (equal to the input voltage ES) has sufficiently stabilized; therefore, at a time instant t7, the switch S1 is turned on so as to implement connection with the overhead line 1. After the time instant t7, the inverter 13 can be operated in the overhead line/battery combination mode in which the overhead line 1 transfers electric power to and receives electric power from the power storage element 14.

As described above, the switch S1 is turned on after the voltage across the terminals of the switch S1 is made sufficiently low by operating the DC-to-DC converter 15A in a step-up manner, thereby making the inverter input voltage EFC (equal to the input voltage ES) coincide with the overhead line voltage ESO; therefore, the voltage difference can be prevented from causing a rush current and damaging the contact of the switch S1.

In such a manner as described above, transition can smoothly be made from the overhead line/battery combination mode to the battery operation mode, or from the battery operation mode to the overhead line/battery combination mode.

Here, the relationship between the loss in the DC-to-DC converter 15A and the amount of energy stored in the power storage element 14 will be quantitatively explained with reference to an example. In general, the loss in the DC-to-DC converter 15A is approximately 3%; thus, when a DC-to-DC converter having capacity 500 KW, which is a minimally necessary amount for driving a single electric rolling stock, is taken as an example, the maximal loss is approximately 15 KW, and the average loss is approximately 5 KW when the travel pattern (accelerating power running, a coasting travel, repetition of regenerative braking) of the electric rolling stock is taken into account. Meanwhile, the amount of energy stored in the power storage element 14 which can be mounted in an electric rolling stock is decided by the mounting space in the electric rolling stock; the energy amount that has been put to practical use is approximately 10 KWh (per car). In other words, the loss of 5 KW suggests that energy stored by fully charging the power storage element 14 is completely dissipated in about 2 hours. As described above, it can be seen that, because the energy that can be stored in the power storage element 14 is limited, the loss in the DC-to-DC converter 15A is not negligible.

As described above, in Embodiment 1 of the present invention, the switch S2 is turned on in the battery operation mode so that the power storage element 14 transfers electric power to and receives electric power from the inverter 13 without the intermediary of the DC-to-Dc converter 15A; therefore, no loss occurs in the DC-to-DC converter 15A, whereby the energy stored in the power storage element 14 can be utilized maximally efficiently for driving an electric rolling stock.

Embodiment 2

Figure 4:
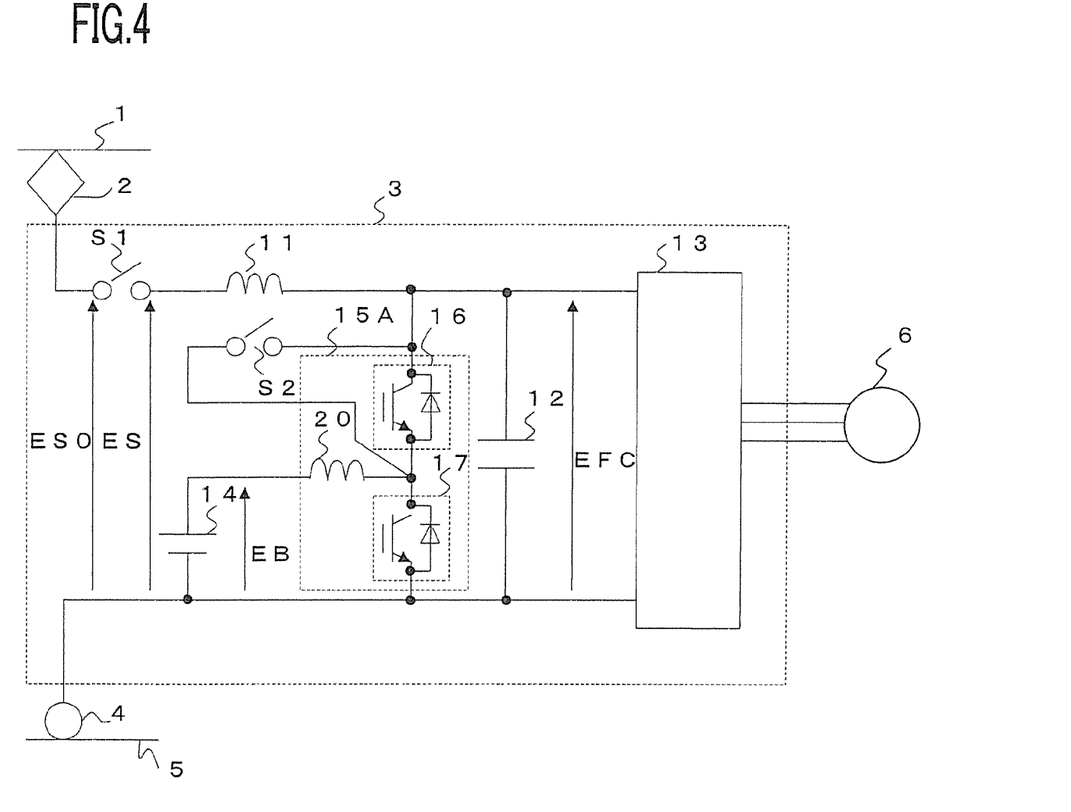
FIG. 4 is a diagram illustrating the configuration including a power converter according to Embodiment 2 of the present invention and an electric rolling stock controller utilizing the power converter.

FIG. 4 is a diagram illustrating a configuration example of an electric rolling stock controller according to Embodiment 2 of the present invention. In comparison with Embodiment 1 illustrated in FIG. 1, the configuration illustrated in FIG. 4 is characterized in that one of the connection points for the switch S2 is changed from the positive side of the power storage element 14 to the connection point between the switching elements 16 and 17. When the switch S2 is turned on, the power storage element 14 is connected in parallel with the capacitor 12, without the intermediary of the switching elements 16 and 17. Other parts are the same as those in the case of Embodiment 1; thus, by designating the same reference numerals, explanations therefor will be omitted.

According to the configuration of Embodiment 2, it is made possible to connect the power storage element 14 with the inverter 13 via the reactor 20. By connecting the power storage element 14 with the inverter 13 via the reactor 20, a ripple current caused by the PWM operation of the inverter 13 can be prevented from flowing into the power storage element 14. Because, when a ripple current flows in the power storage element 14, the internal heat increases, thereby becoming a life shortening factor for the power storage element 14. By employing the configuration according to Embodiment 2, the loss in the power storage element 14 decreases and the life thereof can be prolonged, although the energy loss in the reactor 20 slightly increases; thus, there exists a merit as a whole.

In addition, the operation of the electric rolling stock controller, configured as described above, according to Embodiment 2 is the same as that described in Embodiment 1 (FIGS. 2 and 3); therefore, explanation therefor will be omitted.

As described above, in Embodiment 2 of the present invention, the switch S2 is turned on in the battery operation mode so that the power storage element 14 transfers electric power to and receives electric power from the inverter 13 without the intermediary of the switching element 16; therefore, neither conduction loss nor switching loss occurs in the switching elements 16 and 17, whereby the energy stored in the power storage element 14 can be utilized maximally efficiently for driving an electric rolling stock. Moreover, because the reactor 20 can prevent a ripple current from flowing into the power storage element 14, it is made possible to reduce the loss in the power storage element 14 so as to prolong the life thereof.

Embodiment 3

Figure 5:
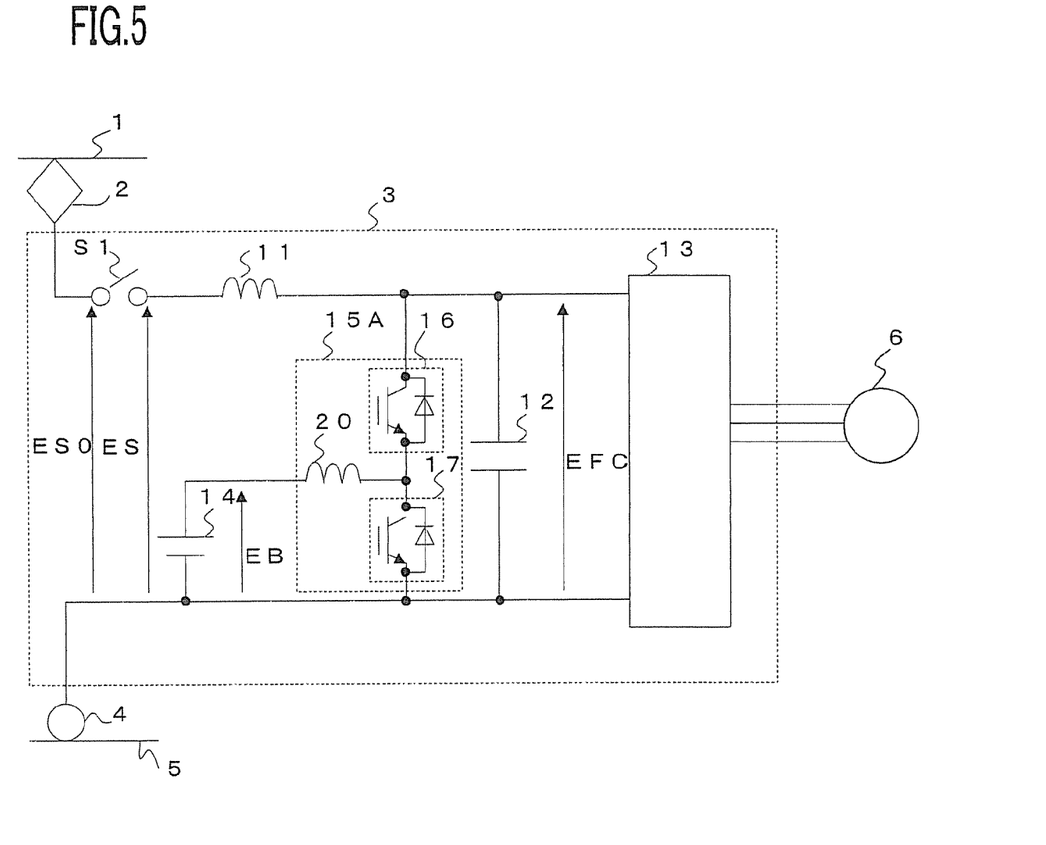
FIG. 5 is a diagram illustrating the configuration including a power converter according to Embodiment 3 of the present invention and an electric rolling stock controller utilizing the power converter.

FIG. 5 is a diagram illustrating a configuration example of an electric rolling stock controller according to Embodiment 3 of the present invention. In comparison with Embodiment 1 illustrated in FIG. 1, the configuration illustrated in FIG. 5 is characterized in that the switch S2 is removed and an operation mode is added to the DC-to-DC converter 15A. Other parts are the same as those in the case of Embodiment 1; thus, by designating the same reference numerals, explanations therefor will be omitted.

As illustrated in FIG. 5, Embodiment 3 is characterized in that the switch S2 is not provided, and the function thereof is replaced by that of the switching element 16 of the DC-to-DC converter 15A. In other words, at the timing, already explained in Embodiment 1 (FIGS. 2 and 3), when the switch S2 is turned on, the switching element 16 is fixed to an on-state (the switching element 17 is fixed to an off-state). By fixing the switching element 16 to an on-state, the power storage element 14 and the inverter 13 can be connected via the switching element 16 and the reactor 20. By utilizing the foregoing configuration, the loss that occurs in the DC-to-DC converter 15A is only the conduction loss in the reactor 20 and the switching element 16, and there occurs none of the switching loss in the switching element 16, the conduction loss and the switching loss in the switching element 17, and the iron loss, due to a switching current, in the reactor 20 that are caused in the case where the DC-to-DC converter 15A is ordinarily operated; thus, the system loss can be reduced, and the addition of the switch S2 is not required.

As described above, in Embodiment 3 of the present invention, the power storage element 14 and the inverter 13 can be connected in the battery operation mode via the switching element 16 and the reactor 20, without adding the switch S2; therefore, the loss in the DC-to-DC converter 15A is reduced, whereby the energy stored in the power storage element 14 can be utilized maximally efficiently for driving an electric rolling stock. Moreover, because the reactor 20 can prevent a ripple current from flowing into the power storage element 14, it is made possible to reduce the loss in the power storage element 14 so as to prolong the life thereof.

Embodiment 4

Figure 6:
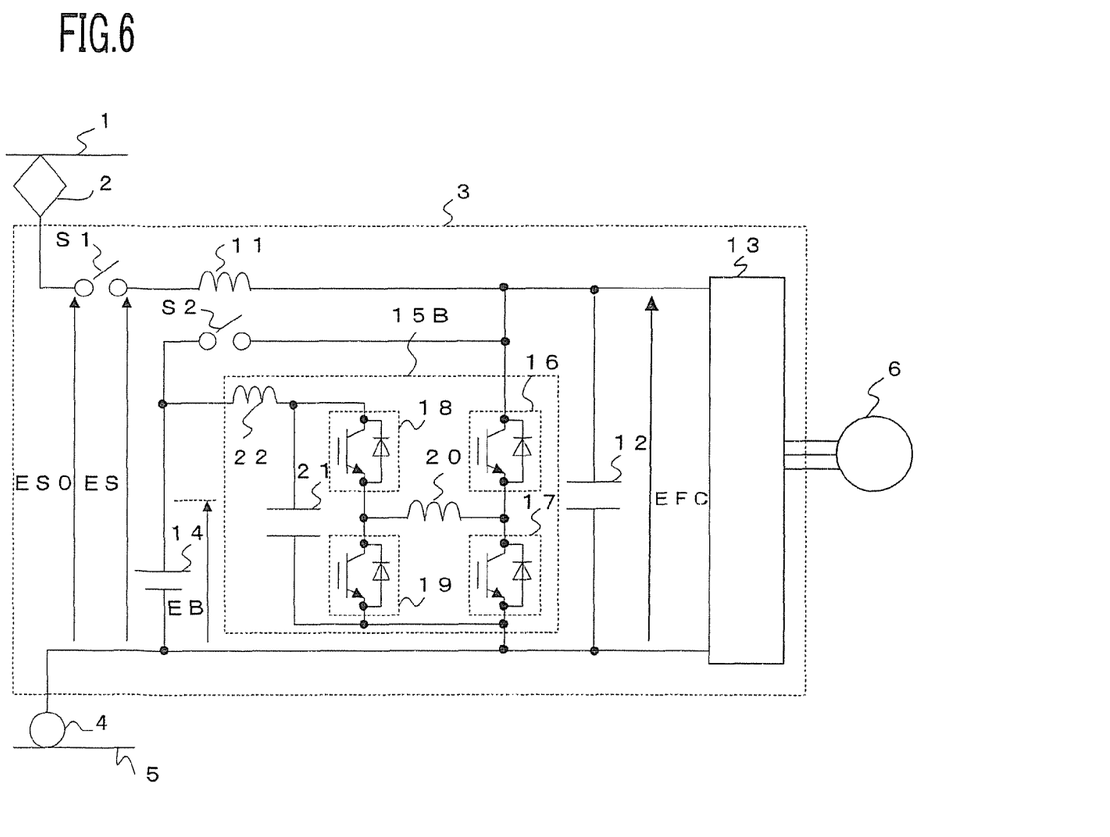
FIG. 6 is a diagram illustrating the configuration including a power converter according to Embodiment 4 of the present invention and an electric rolling stock controller utilizing the power converter.

FIG. 6 is a diagram illustrating a configuration example of an electric rolling stock controller according to Embodiment 4 of the present invention. In comparison with Embodiment 1 illustrated in FIG. 1, the configuration according to Embodiment 4 illustrated in FIG. 6 is characterized in that the DC-to-DC converter 15A is replaced by a DC-to-DC converter 15B. Other parts are the same as those in the case of Embodiment 1; thus, by designating the same reference numerals, explanations therefor will be omitted.

In FIG. 6, the DC-to-DC converter 15B is formed of a so-called bidirectional step-up and step-down DC-to-DC converter circuit configured with switching elements 16 to 19 that perform a PWM operation, reactors 20 and 22, and a capacitor 21; the DC-to-DC converter 15B is characterized in that electric-power control can be performed in an arbitrary direction, regardless of the magnitude relationship between the voltage EB across the power storage element 14 and the inverter input voltage EFC. Accordingly, the voltage EB across the power storage element 14 can be set regardless of the variation lower limit value of the overhead line voltage ESO; therefore, the voltage EB across the power storage element 14 can also be set to a value equal to the nominal value of the overhead line voltage ESO or to a value higher than the nominal value of the overhead line voltage ESO.

Further explanation will be made below. In the configuration according to Embodiment 1, because, as explained above, the voltage EB across the power storage element 14 is required to be set lower than the overhead line voltage ESO, the inverter input voltage EFC becomes lower in the battery operation mode than in the overhead line/battery combination mode; therefore the torque generated by the motor 6 is reduced or in the case where the same electric power is supplied to the inverter 13, the current in the power storage element 14 increases, whereby the loss may be increased. In contrast, according to the configuration of Embodiment 4, it is made possible to ensure the inverter input voltage EFC, in the battery operation mode, that is the same as or higher than the inverter input voltage EFC in the overhead line/battery combination mode. Accordingly, in the battery operation mode, the inverter input voltage EFC does not become lower than in the overhead line/battery combination mode, whereby the torque generated in the motor 6 can sufficiently be ensured, and the traveling performance, of the electric rolling stock, which is equivalent to the traveling performance in the overhead line/battery combination mode can be ensured without increasing the current in the power storage element 14. In the explanation below, a case will be explained in which the voltage EB across the power storage element 14 is set slightly higher than the nominal value of the overhead line voltage ESO.

Next, the operation of the electric rolling stock controller, configured as described above, according to Embodiment 4 will be explained. The respective operations in the overhead line/battery combination mode and the battery operation mode are similar to those explained in Embodiment 1; therefore, explanations therefor will be omitted. Therefore, here, the operation in the case in which transition is made from the overhead line/battery combination mode to the battery operation mode and the operation in the case in which transition is made from the battery operation mode to the overhead line/battery combination mode will be explained.

Figure 7:
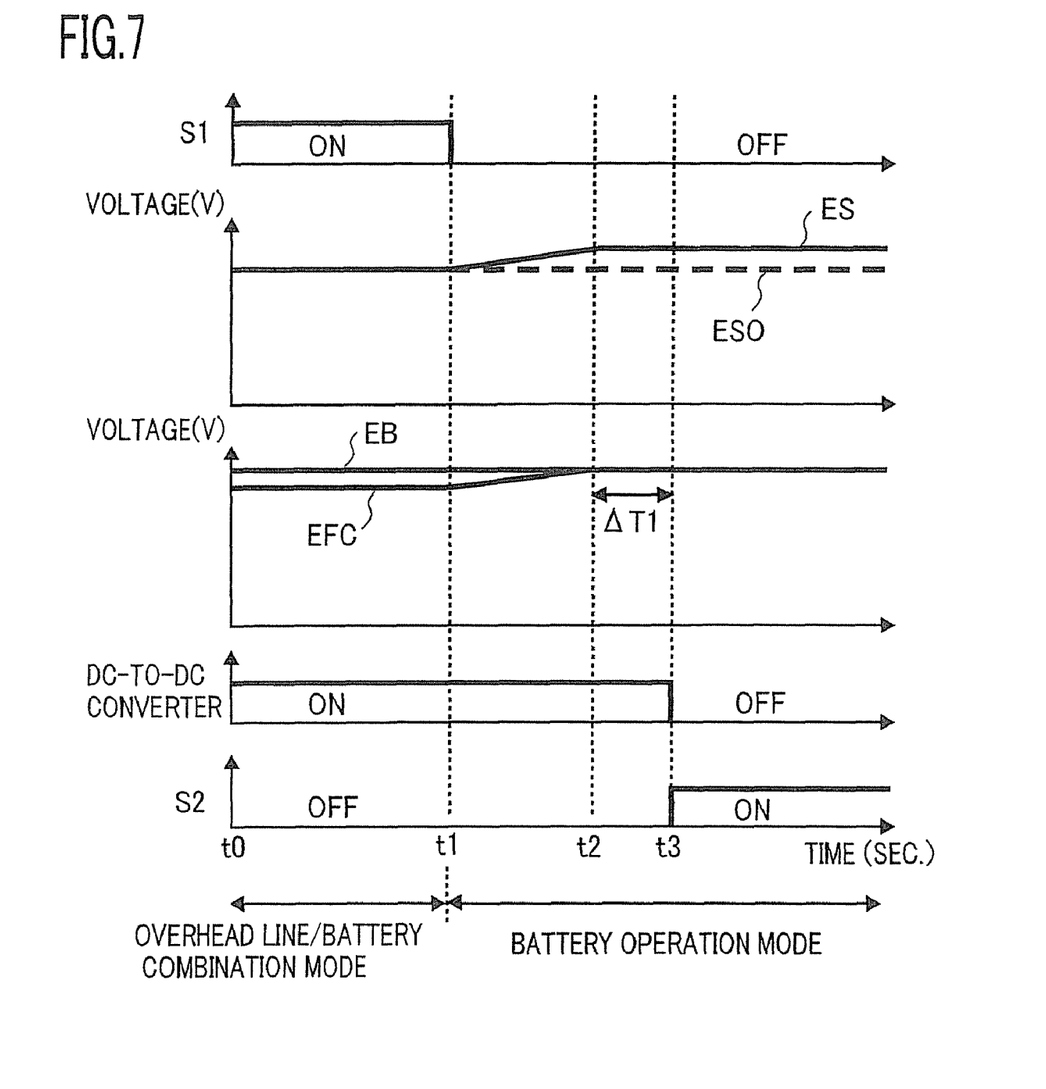
FIG. 7 is a chart for explaining the transition, according to Embodiment 4 of the present invention, from an overhead line/battery combination mode to a battery operation mode.

FIG. 7 is a chart for explaining the transition, according to Embodiment 4 of the present invention, from the overhead line/battery combination mode to the battery operation mode. As represented in FIG. 7, in the overhead line/battery combination mode during the time period between the time instant t0 and the time instant t1, the switch S1 and the DC-to-DC converter 15B are turned on (the switching elements 16 to 19 are in a PWM operation); therefore, the overhead line voltage ESO is applied to the capacitor 12, and the voltage EB across the power storage element 14 is stepped down by the DC-to-DC converter 15B and then applied to the capacitor 12. Accordingly, an input voltage ES at the stage after the switch is equal to the overhead line voltage ESO, and the inverter input voltage EFC is equal to the input voltage ES.

Next, at the time instant t1, the overhead line/battery combination mode is ended, and then the switch S1 is turned off. In addition, it is preferable that, in order to prevent the sudden change in the current, the switch S1 is turned off after the current in the switch S1 is reduced to a considerably small value (after being reduced to a value the same as or lower than a setting value) by reducing the output of the inverter 13 to a value the same as or lower than a setting value, or by performing control in such a way that almost or all the electric power of the inverter 13 is imposed on the power storage element 14. After that, the DC-to-DC converter 15B is made to perform step-up operation in such a way that the inverter input voltage EFC and the voltage EB across the power storage element 14 coincide with each other.

When, at a time instant t2, the inverter input voltage EFC coincides with the voltage EB across the power storage element 14, the DC-to-DC converter 15B is controlled in such a way that the state in which the inverter input voltage EFC coincides with the voltage EB across the power storage element 14 is maintained. After the state in which the difference between the inverter input voltage EFC and the voltage EB across the power storage element 14 is the same as or smaller than a setting value continues for $\Delta T1$ (at a time instant t3), it can be determined that the inverter input voltage EFC has sufficiently stabilized; therefore, the switch S2 is turned on, and the DC-to-Dc converter 15B is turned off. As a result, the current that flows from the power storage element 14 to the inverter 13 changes its path from a route through the DC-to-DC converter 15B to a route through the switch S2 and without the intermediary of the DC-to-to converter 15B. In such a manner as described above, transition can smoothly be made from the overhead line/battery combination mode to the battery operation mode.

Figure 8:
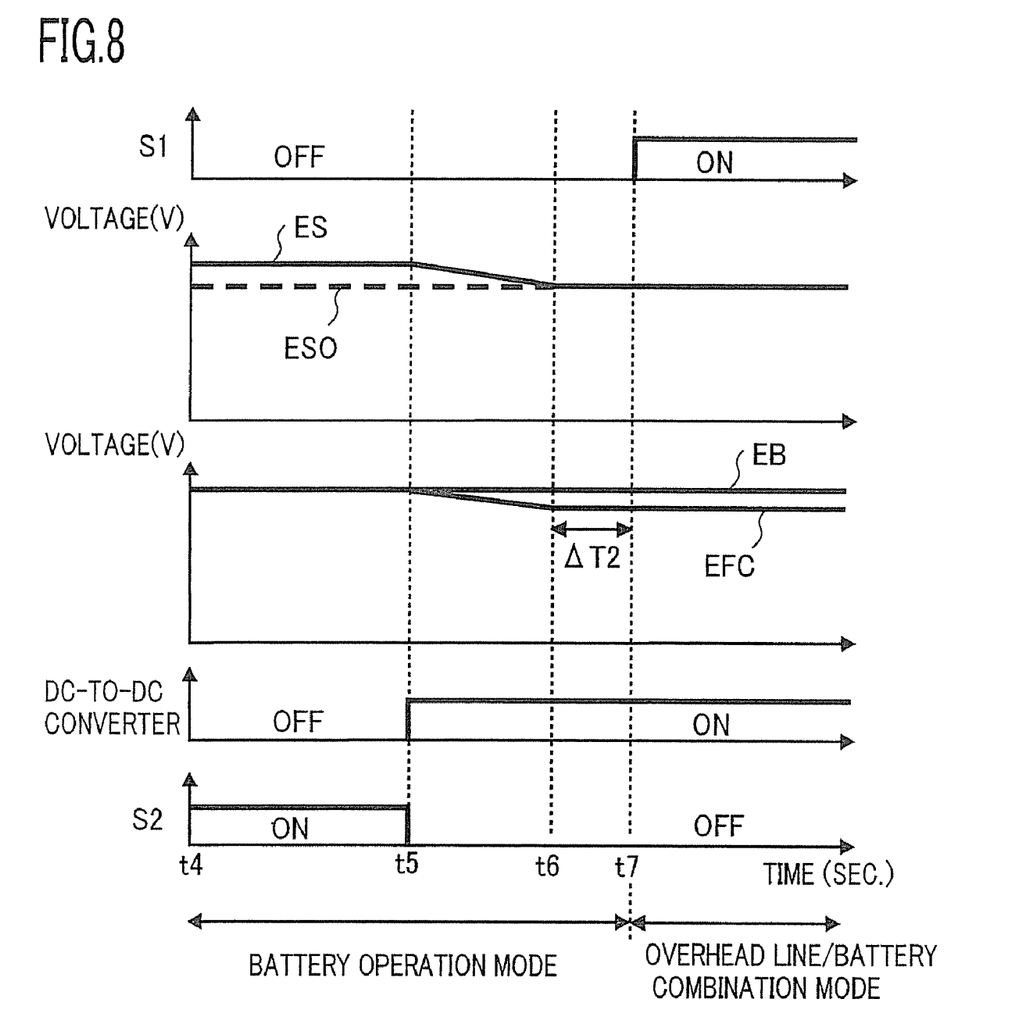
FIG. 8 is a chart for explaining the transition, according to Embodiment 4 of the present invention, from the battery operation mode to the overhead line/battery combination mode.

Next, the operation in the case in which transition is made from the battery operation mode to the overhead line/battery combination mode will be explained. FIG. 8 is a chart for explaining the transition, according to Embodiment 4, from the battery operation mode to the overhead line/battery combination mode. As represented in FIG. 8, in the time period between a time instant t4 and a time instant t5, the switch S1 and the DC-to-DC converter 15B are turned off, and the switch S2 is turned on; in the foregoing time period, the power storage element 14 directly transfers electric power to and receives electric power from the inverter 13.

Next, at the time instant t5, as preparation for the transition to the overhead line/battery combination mode, the switch S2 is turned off, and at the same time, the DC-to-DC converter 15B is activated. In addition, it is preferable that, in order to prevent fluctuation in the current from being caused, turning off the switch S2 and activation of the DC-to-DC converter 15B are made after the current of the power storage element 14 is reduced to a value the same as or smaller than a setting value by suppressing the current of the inverter 13.

After the time instant t5, the DC-to-DC converter 15B is made to operate in a step-down manner so as to step down the voltage EB across the power storage element 14 and supply the stepped down voltage to the capacitor 12, and controlled in such a way that the inverter input voltage EFC and the overhead line voltage ESO coincide with each other. At a time instant t6, the inverter input voltage EFC coincides with the overhead line voltage ESO. After the state in which the difference between the inverter input voltage EFC and the overhead line voltage ESO is the same as or smaller than a setting value continues for $\Delta T2$, it can be determined that the inverter input voltage EFC has sufficiently stabilized; therefore, at a time instant t7, the switch S1 is turned on so as to implement connection with the overhead line 1. After the time instant t7, the inverter 13 can be operated in the overhead line/battery combination mode in which the overhead line 1 transfers electric power to and receives electric power from the power storage element 14. As described above, the switch S1 is turned on after the voltage across the terminals of the switch S1 is made sufficiently low by operating the DC-to-DC converter 15B in a step-down manner, thereby making the inverter input voltage EFC coincide with the overhead line voltage ESO; therefore, the voltage difference can be prevented from causing a rush current and damaging the contact of the switch S1.

In such a manner as described above, transition can smoothly be made from the overhead line/battery combination mode to the battery operation mode, or from the battery operation mode to the overhead line/battery combination mode.

Here, as described above, in comparison with the DC-to-DC converter 15A in Embodiment 1, the DC-to-DC converter 15B is characterized in that it can be controlled regardless of the magnitude relationship between the voltage EB across the power storage element 14 and the inverter input voltage EFC. The loss in the DC-to-DC converter 15B is larger than that in the DC-to-DC converter 15A. However, in the configuration according to Embodiment 4, the switch S2 is turned on in the battery operation mode so that the power storage element 14 transfers electric power to and receives electric power from the inverter 13 without the intermediary of the DC-to-Dc converter 15B; therefore, no loss occurs in the DC-to-DC converter 15B, whereby the energy stored in the power storage element 14 can be utilized maximally efficiently for driving an electric rolling stock. Moreover, in the battery operation mode, the inverter input voltage EFC does not become lower, whereby the torque generated in the motor 6 can sufficiently be ensured, and the traveling performance, of the electric rolling stock, which is equivalent to the traveling performance in the overhead line/battery combination mode can be ensured without increasing the current in the power storage element 14.

Embodiment 5

Figure 9:
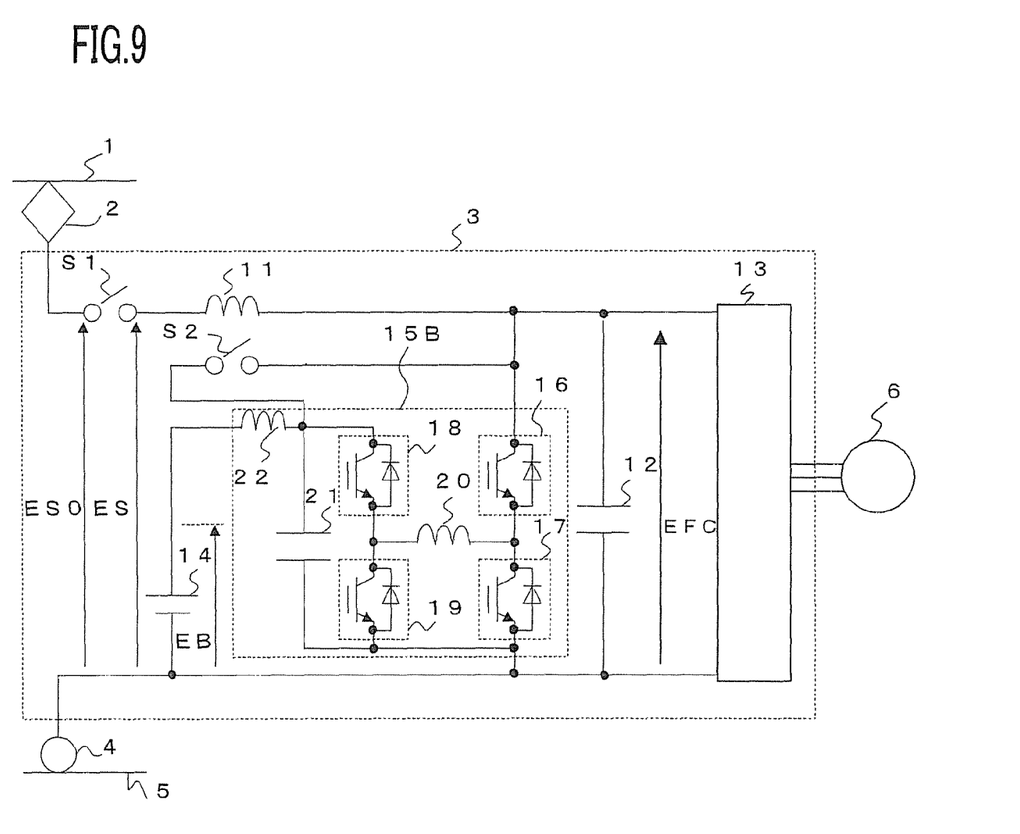
FIG. 9 is a diagram illustrating the configuration including a power converter according to Embodiment 5 of the present invention and an electric rolling stock controller utilizing the power converter.

FIG. 9 is a diagram illustrating a configuration example of an electric rolling stock controller according to Embodiment 5 of the present invention. In comparison with Embodiment 4 illustrated in FIG. 6, the configuration, illustrated in FIG. 9, according to Embodiment 5 is characterized in that one of the connection points for the switch S2 is changed from the positive side of the power storage element 14 to the connection point between the switching element 18 and the reactor 22. Other parts are the same as those in the case of Embodiment 4; thus, by designating the same reference numerals, explanations therefor will be omitted.

According to the configuration of Embodiment 5, it is made possible to connect the power storage element 14 and the inverter 13 via the reactor 22. By connecting the power storage element 14 with the inverter 13 via the reactor 22, a ripple current caused by the PWM operation of the inverter 13 can be prevented from flowing into the power storage element 14. Because, when a ripple current flows in the power storage element 14, the internal heat increases, thereby becoming a life shortening factor for the power storage element 14. By employing the configuration according to Embodiment 5, the loss in the power storage element 14 decreases and the life thereof can be prolonged, although the loss in the reactor 22 increases; thus, there exists a merit as a whole.

In addition, the operation of the electric rolling stock controller, configured as described above, according to Embodiment 5 is the same as that described in Embodiment 4; therefore, explanation therefor will be omitted.

As described above, in Embodiment 5 of the present invention, the switch S2 is turned on in the battery operation mode so that the power storage element 14 transfers electric power to and receives electric power from the inverter 13 without the intermediary of the switching elements 16 to 19 and the reactor 20; therefore, neither conduction loss nor switching loss occurs in the switching elements 16 and 19 and no loss occurs in the reactor 20, whereby the energy stored in the power storage element 14 can be utilized maximally efficiently for driving an electric rolling stock. Moreover, because the reactor 22 can prevent a ripple current from flowing into the power storage element 14, it is made possible to reduce the loss in the power storage element 14 so as to prolong the life thereof.

Embodiment 6

Figure 10:
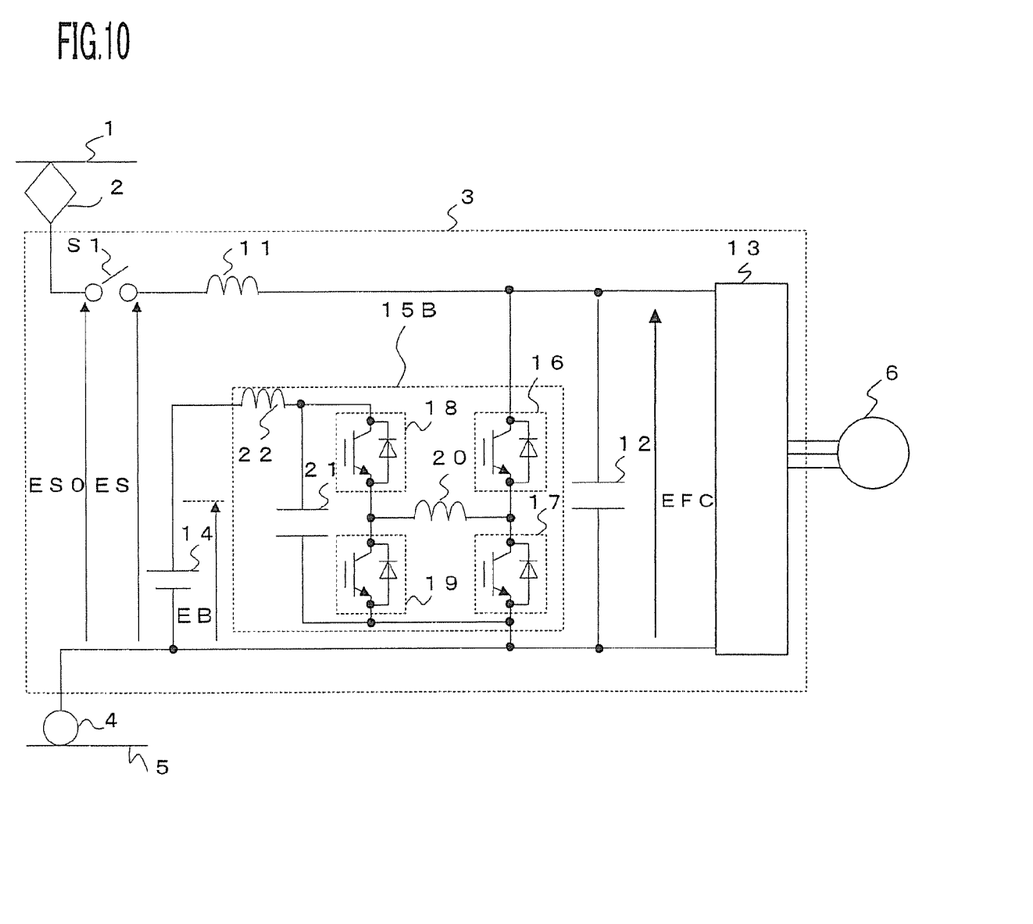
FIG. 10 is a diagram illustrating the configuration including a power converter according to Embodiment 6 of the present invention and an electric rolling stock controller utilizing the power converter.

FIG. 10 is a diagram illustrating a configuration example of an electric rolling stock controller according to Embodiment 6 of the present invention. In comparison with Embodiment 4 illustrated in FIG. 6, the configuration, illustrated in FIG. 10, according to Embodiment 6 is characterized in that the switch S2 is removed and an operation mode is added to the DC-to-DC converter 15B. Other parts are the same as those in the case of Embodiment 4; thus, by designating the same reference numerals, explanations therefor will be omitted.

As illustrated in FIG. 10, Embodiment 6 is characterized in that the switch S2 is not provided, and the function thereof is replaced by the switching elements 16 and 18. In other words, at the timing, already explained in Embodiment 4 (FIGS. 7 and 8), when the switch S2 is turned on, the switching elements 16 and 18 are fixed to an on-state (the switching elements 17 and 19 are fixed to an off-state). By fixing the switching elements 16 and 18 to an on-state, the power storage element 14 and the inverter 13 can be connected via the switching elements 16 and 18 and the reactors 20 and 22.

By utilizing the foregoing configuration, the loss that occurs in the DC-to-DC converter 15B is only the conduction losses in the reactors 20 and 22 and the switching elements 16 and 18, and there occurs none of the switching loss in the switching elements 16 and 18, the conduction loss and the switching loss in the switching elements 17 and 19, and the iron loss, due to the switching current, in the reactors 20 and 22 that are caused in the case where the DC-to-DC converter 15B is ordinarily operated; thus, the system loss can be reduced, and the addition of the switch S2 is not required.

As explained above, in Embodiment 6 of the present invention, the power storage element 14 and the inverter 13 can be connected in the battery operation mode via the switching elements 16 and 18 and the reactors 18 and 22, without adding the switch S2; therefore, the loss in the DC-to-DC converter 15B is reduced, whereby the energy stored in the power storage element 14 can be utilized maximally efficiently for driving an electric rolling stock. Moreover, because the reactors 20 and 22 can prevent a ripple current from flowing into the power storage element 14, it is made possible to reduce the loss in the power storage element 14 so as to prolong the life thereof.

The configurations described in the foregoing embodiments are examples of the aspects of the present invention and can be combined with other publicly known technologies; it goes without saying that various features of the present invention can be configured, by modifying, for example, partially omitting the foregoing embodiments, without departing from the scope and spirit of the present invention.

For example, although not illustrated, the present invention may be applied to a power converter configured in such a way that AC power supplied by a power collector is converted into DC power and inputted to the inverter 13. Additionally, it is also possible to apply the present invention to a so-called auxiliary power source apparatus in which loads such as a vehicle air conditioner and an illumination apparatus are connected to the output terminal of the inverter 13 via devices other than a motor, e.g., a transformer and a smoothing circuit, and the inverter is operated with a constant voltage and at a constant frequency so that constant-voltage and constant-frequency power is supplied to the loads.

INDUSTRIAL APPLICABILITY

In the foregoing embodiments, the aspects of the invention have been explained by taking, as examples, cases where a power converter is applied to the field of electric streetcars; however, the application field of the present invention is not limited thereto; the present invention can be applied to various related fields such as fields of electric automobiles and elevators.

The invention claimed is:

1. A power converter comprising:
an inverter that supplies a load with electric power;
a capacitor connected between DC terminals of the inverter;
a power supply switch provided between one terminal of the capacitor and a power collector;
a power storage unit that stores DC power;
a DC-to-DC converter having a reactor and at least one pair of switching elements connected in series for charging the power storage unit with electric power and discharging electric power from the power storage unit, the DC-to-DC converter being connected in parallel with the capacitor; and
a bypass switch that connects the power storage unit in parallel with the capacitor, without the intermediary of the at least one pair of switching elements of the converter.

2. An electric rolling stock controller comprising:
an inverter that drives a motor;
a capacitor connected between DC terminals of the inverter;

a power supply switch provided between one terminal of the capacitor and an overhead line;

a power storage unit that stores DC power;

a DC-to-DC converter having a reactor and at least one pair of switching elements connected in series for charging the power storage unit with electric power and discharging electric power from the power storage unit, the DC-to-DC converter being connected in parallel with the capacitor; and a bypass switch that connects the power storage unit in parallel with the capacitor, without the intermediary of the at least one pair of switching elements of the converter.

3. The electric rolling stock controller according to claim 2, wherein the bypass switch connects the power storage unit in parallel with the capacitor via the reactor.

4. The electric rolling stock controller according to claim 2, wherein, when the power supply switch is off, the bypass switch is on.

5. The electric rolling stock controller according to claim 4, wherein, in the case where the power supply switch and the bypass switch are off, the DC-to-DC converter is activated, and the difference between the voltage across the capacitor and the voltage across the power storage unit is smaller than a predetermined value, the bypass switch is turned on and the switching operation of the DC-to-DC converter is halted.

6. The electric rolling stock controller according to claim 4, wherein, in the case where the power supply switch and the bypass switch are off, the DC-to-DC converter is activated, and the difference between the voltage across the capacitor and the voltage of the overhead line is smaller than a predetermined value, the power supply switch is turned on.

* * * * *